United States Patent Office 3,226,348
Patented Dec. 28, 1965

3,226,348
NOVEL ALKYD RESINS MODIFIED WITH TRIS-(HYDROXYMETHYL)AMINOMETHANE
Robert F. Purcell and Lowell D. Pals, both of Terre Haute, Ind., assignors to Commercial Solvents Corporation, New York, N.Y., a corporation of Maryland
No Drawing. Filed Jan. 25, 1961, Ser. No. 84,771
15 Claims. (Cl. 260—22)

Our invention relates to novel and useful alkyl resins and a process for preparing same; and more particularly our invention relates to new and useful alkyd resins which are the reaction products of monoglycerides or other alcohol esters with phthalic anhydride and tris(hydroxymethyl)aminomethane.

In general, the preparation of useful alkyd resins depends to a large extent upon obtaining mixtures of molecules of a maximum complexity with respect to their spatial architecture. The product formed on essentially complete esterification of phthalic anhydride with simple glycerin is a hard, brittle, resin. Many modifications of the polyhydric alcohol reactants have been made in order to produce alkyd resins containing more desirable properties. In the past various monoglycerides have been used instead of unsubstituted polyhydric alcohols to provide more desirable properties in the alkyd resins. These monoglycerides can be obtained by alcoholysis of triglycerides such as naturally occurring vegetable oils or can be obtained by reacting fatty acids directly with polyhydric alcohols in correct proportions to form monoglycerides. Phthalic anhydride is not soluble in most polyglycerides, thus the reason for forming monoglycerides or alcohol esters.

A substantial portion of alkyd resins produced commercially are used in paint compositions. Our new alkyd resins impart very desirable qualities to paint compositions. Our alkyd resins give paints, formulated with them, improved chemical resistance, improved weathering, and at the same time are light colored and do not interfere with the pigmentation of the paint. These are very desirable qualities which have been long sought in the art.

The new alkyd resins of our invention can be prepared by reacting monoglycerides or other alcohol esters with phthalic anhydride and tris(hydroxymethyl)aminomethane.

The monoglycerides or alcohol esters we employ in producing our new alkyd resins can be used as such or can be made available in situ. The in situ preparation of monoglycerides can be accomplished by alcoholysis of triglycerides with glycerin or by combining fatty acids with glycerin, or by any other convenient method. When other alcohol esters are desired, we can substitute pentaerythritol for all or part of the glycerin thus forming different alcohol esters. These alcohol esters are utilized in the same way as the monoglycerides to form our novel alkyd resins.

In preparing the alkyd resins of our invention, we react a monoglyceride or other alcohol ester with phthalic anhydride and tris(hydroxymethyl)aminomethane. When tris(hydroxymethyl)aminomethane is contacted with phthalic anhydride the phthalimide of tris(hydroxymethyl)aminomethane is produced and thus the tris(hydroxymethyl)aminomethane and the anhydride are prevented from participating in the alkyd resin formation reaction. In the process of our invention, we partially interact the phthalic anhydride with the alcohol ester or monoglyceride before adding tris(hydroxymethyl)aminomethane to the reaction mixture. In order to form the imide, the phthalic anhydride must have both its acid functions available to combine with the nitrogen atom of tris(hydroxymethyl)aminomethane. By partially combining the phthalic anhydride with the alcohol ester or monoglyceride we thus prevent the formation of the imide.

The fatty acids we can use in the in situ preparation of monoglycerides or alcohol esters are fatty acids such as linseed oil fatty acids, tall oil fatty acids, soya oil fatty acids, castor oil fatty acids, etc. We prefer to employ a triglyceride such as linseed oil, castor oil, tall oil, soybean oil, etc., and combine it with a polyhydric alcohol such as glycerin, pentaerythritol, etc., to form the monoglyceride or respective alcohol ester in situ. We then partially interact the alcohol ester with the phthalic anhydride. After the phthalic anhydride is partially interacted with the alcohol ester we add tris(hydroxymethyl)aminomethane and continue the reaction to completion of the formation of the alkyd resin.

In the process of our invention we can employ from about 1% to about 15% tris(hydroxymethyl)aminomethane. We prefer to prepare the alkyd resins of our invention by first agitating the triglyceride with the polyhydric alcohol at about 100° C. We then preferably but not necessarily add a catalyst such as lead oxide, calcium naphthenate, etc., and increase the temperature to from about 220° C. to about 250° C. while continually agitating the reactants. In order to determine when to add the phthalic anhydride we periodically check the solubility of the reaction mixture in hot methanol to determine the completion of alcoholysis. Other appropriate tests may be used to determine the completion of the alcoholysis reaction. The phthalic anhydride is added when 1 part of reaction mixture is soluble in 5 parts of hot methanol. After adding the phthalic anhydride we periodically determine the acid number of the reaction mixture. When the acid number of the reaction mixture in the 20–60 range we reduce the temperature to from about 180° C. to about 210° C. and add the tris(hydroxymethyl)aminomethane. We then continually agitate the reaction mixture at 210° C. until the acid number is about 10.

Throughout the reaction, benzene or toluene is added as required to more accurately control the temperature of the mixture and to aid in the removal of water by formation of an azeotrope. The benzene, toluene, or other similar material is removed at the end of the reaction by distillation. In order to facilitate the handling of some of our new alkyd resins, we add mineral spirits to the reaction product upon completion of the reaction.

Throughout our reaction we can bubble an inert gas through the reaction mixture since we have found that the use of such inert gas improves agitation, promotes better color, and speeds the reaction by helping to remove liberated water. The turbulent effect of the bubbles intensifies the effect of agitation, thus speeding up alcoholysis and esterification. Suitable inert gases include nitrogen, $CO_2$, etc.

Radically different properties in phthalic alkyds can be obtained by varying the oil length, the oil length being the ratio of the amount of glyceryl phthalate produced to amount of glycerol ester (oil) employed. Factors such as the drying rate, solubility, compatability, durability, etc., are affected by the oil length. Oil lengths are usually spoken of as "long-, medium-, or short-oils." Long-oil alkyds contain from 22 to 29 gallons of oil per 100 pounds of glyceryl phthalate (or 64–70% oil to 28–23% phthalic anhydride). Medium-oil alkyds contain 14 to 20 gallons of oil per 100 pounds of glyceryl phthalate (or 53–61% oil to 36–30% phthalic anhydride). Short-oil alkyds contain 9 to 12.5 gallons of oil per 100 pounds of glyceryl phthalate (or 42 to 50% oil to 45–39% phthalic anhydride).

Depending on the oil length and amount of tris(hydroxymethyl)aminomethane used to form our alkyd resins, we have formulated some mole ratios that can be used in carrying out our reaction.

TABLE 1.—MOLE RATIOS

|  | 1 mole percent of the polyol as tris(hydroxymethyl)aminomethane | | 10 mole percent of the polyol as tris(hydroxymethyl)aminomethane | | 15 mole percent of the polyol as tris(hydroxymethyl)aminomethane | |
| --- | --- | --- | --- | --- | --- | --- |
|  | Long oil | Short oil | Long oil | Short oil | Long oil | Short oil |
| Glycerin | 1.10 | 1.50 | 1.00 | 1.40 | 0.92 | 1.33 |
| Triglyceride | 1.00 | 0.30 | 1.00 | 0.30 | 1.00 | 0.30 |
| Phthalic anhydride | 1.60 | 1.70 | 1.60 | 1.80 | 1.60 | 1.80 |
| Tris(hydroxymethyl)aminomethane | 0.01 | 0.02 | 0.11 | 0.16 | 0.16 | 0.23 |

Other polyhydric alcohols can be used and substituted on an equivalency basis, for example pentaerythritol:

TABLE II.—MOLE RATIOS

|  | 1 mole percent of the polyol as tris(hydroxymethyl)aminomethane | | 10 mole percent of the polyol as tris(hydroxymethyl)aminomethane | | 15 mole percent of the polyol as tris(hydroxymethyl)aminomethane | |
| --- | --- | --- | --- | --- | --- | --- |
|  | Long oil | Short oil | Long oil | Short oil | Long oil | Short oil |
| Pentaerythritol | 0.82 | 1.14 | 0.82 | 1.04 | 0.70 | 0.98 |
| Triglyceride | 1.00 | 0.25 | 1.00 | 0.25 | 1.00 | 0.25 |
| Phthalic anhydride | 1.60 | 1.40 | 1.60 | 1.40 | 1.60 | 1.40 |
| Tris(hydroxymethyl)aminomethane | 0.01 | 0.01 | 0.11 | 0.11 | 0.16 | 0.17 |

It will be readily seen from the above tables that the oil length can be varied by varying the ratio of triglyceride to phthalic anhydride and that the amount of tris(hydroxymethyl)aminomethane will vary inversely with the amount of polyhydric alcohol used. The above table is not a limiting table but merely illustrative of combinations that can be employed.

A sample paint formulation which employed the alkyd resins of our invention is set forth below. This paint was substantially more resistant chemically than normal paints. Also because of the alkyd resins of our invention, this paint was noted to have improved weathering qualities in that there was a very high gloss retention and less chalking than normal paints.

TABLE III.—SAMPLE PAINT COMPOSITION

|  | Grams |
| --- | --- |
| Rutile titanium dioxide | 250 |
| Tris(hydroxymethyl)aminomethane (10%) in alkyd resin solution (50% in mineral spirits) | 590 |
| Mineral spirits | 90 |
| Methyl ethyl ketoxime | 3 |
| 24% lead naphthenate | 7.4 |
| 6% cobalt naphthenate | 3.0 |

The following specific examples are offered to illustrate my invention; and it is not intended that my invention be limited to the specific amounts, proportions, and procedures set forth therein.

*Example I*

In a 3-liter, 4-necked flask fitted with a stirrer, moisture trap, water condenser, gas inlet and opening for additions, were charged 672 grams of soya oil and 218 grams of glycerin. The mixture was stirred and heated to 100° C. At that time 0.5 gram of lead oxide was added and the temperature increased to 235° C. When the solubility of the reaction mixture in hot methanol surpassed 5 parts of methanol to 1 part of reaction mixture, 500 grams of phthalic anhydride were added. The acid number was periodically checked and when the acid number was 50, the temperature was reduced to 210° C. and 30.5 grams of tris(hydroxymethyl)aminomethane were added. The reaction mixture was continuously stirred at a temperature at 210° C. until the acid number was 11. Throughout the reaction cold benzene was added as needed to control the temperature. This benzene was removed from the reaction mixture by distillation upon completion of the reaction. Also throughout the reaction, nitrogen was bubbled through the mixture at 200 cc./min. and a nitrogen atmosphere was kept in the flask above the reaction mixture. To facilitate handling of the alkyd resin produced, mineral spirits were added to the resin to form a 50% solids mixture. The 50% alkyd resin in mineral spirits had a Gardner Color of 5. The Gardner viscosity was U+ and the acid number was 11 (solids).

*Example II*

In a 3-liter, 4-necked flask fitted with a stirrer, moisture trap, water condenser, gas inlet and opening for addition, were charged 672 grams of linseed oil and 209 grams of glycerin. The mixture was stirred and heated to 120° C. At that time 0.5 grams of lead oxide was added and the temperature increased to 235° C. When the solubility of the reaction mixture in hot methanol surpassed 5 parts of methanol to 1 part of reaction mixture, 500 grams of phthalic anhydride were added. The acid number was periodically checked and when the acid number was 20, the temperature was reduced to 180° C., and 30.5 grams of tris(hydroxymethyl)aminomethane were added. The reaction mixture was continuously stirred at a temperature of 210° C. until the acid number was 5. Throughout the reaction cold toluene was added as needed to control the temperature. The toluene was removed from the reaction mixture by distillation upon completion of the reaction. Also throughout the reaction, carbon dioxide was bubbled through the mixture at 200 cc./min. and a carbon dioxide atmosphere was kept in the flask above the reaction mixture. To facilitate handling of the alkyl resin produced, mineral spirits were added to the resin to form a 50% solids mixture. The 50% alkyd resin in mineral spirits had a Gardner Color of 5. The Gardener viscosity was 2–3 and the acid number was 5 (solids).

*Example III*

In a 3-liter, 4-necked flask fitted with a stirrer, moisture trap, water condenser, gas inlet and opening for additions, were charged 648 grams of linseed oil and 138 grams of glycerin. The mixture was stirred and heated to 100° C. At that time 0.3 gram of lead oxide was added and the temperature increased to 220° C. When the solubility of the reaction mixture in hot methanol surpassed 5 parts of methanol to 1 part of reaction mixture, 296 grams of phthalic anhydride were added. The acid number was periodically checked and when the acid number was 50, the temperature was reduced to 200° C. and 19.4 grams of tris(hydroxymethyl)aminomethane were added. The reaction mixture was continuously stirred at a temperature of 210° C. until the acid number was 7. Throughout the reaction cold benzene was added as needed to control the temperature. The benzene was removed from the reaction mixture by distillation upon completion of the reaction. Also throughout the reaction, nitrogen was bubbled through the mixture at 200 cc./min. and a nitrogen atmosphere was kept in the flask above the reaction mixture. To facilitate handling of the alkyd resin produced, mineral spirits were added to the resin to form a 70% solids mixture. The 70% alkyd resin in mineral spirits had a Gardner Color of 6.

*Example IV*

In a 3-liter, 4-necked flask fitted with a stirrer, moisture trap, water condenser, gas inlet and opening for additions, were charged 625 grams of linseed oil which were heated to 250° C. Then 73.5 grams of pentaerythritol were added to the flask and the mixture was continuously stirred throughout the rest of the process. After 10 minutes 0.3 gram of lead oxide was added and 15 minutes after that 73.5 more grams of pentaerythritol were added to the flask. When the solubility of the reaction mixture in hot methanol surpassed 5 parts of methanol to 1 part of reaction mixture, 296 grams of phthalic anhydride were added and the temperature maintained at 230° C. The acid number was periodically checked and when the acid number was 50, the temperature was reduced to 210° C. and 19.4 grams of tris(hydroxymethyl)aminomethane were added. The reaction mixture was continuously stirred at a temperature of 210° C. until the acid number was 11. Throughout the reaction cold benzene was added as needed to control the temperature. The benzene was removed from the reaction mixture by distillation upon completion of the reaction. Also throughout the reaction nitrogen was bubbled through the mixture at 20 cc./min. and a nitrogen atmosphere was kept in the flask above the reaction mixture. To facilitate handling of the alkyd resin produced, mineral spirits were added to the resin to form a 70% solids mixture. The 70% alkyd resin in mineral spirits had a Gardner Color of 7. The Gardner viscosity was Z–6 and the acid number was 11 (solids).

*Example V*

In a 3-liter, 4-necked flask fitted with a stirrer, moisture trap, water condenser, gas inlet and opening for additions, were charged 1242 grams of tall oil fatty acids and 142 grams of glycerin. The mixture was stirred and heated to 250° C. At that time 73.5 grams of pentaerythritol were added and 10 minutes later another 73.5 grams of pentaerythritol were added. The reaction mixture was stirred throughout the process. After 10 minutes had elapsed, 296 grams of phthalic anhydride were added and the temperature maintained at 225° C. The acid number was periodically checked and when the acid number was 50, the temperature was reduced to 210° C. and 19.4 grams of tris(hydroxymethyl)aminomethane were added. The reaction mixture was continuously stirred at a temperature of 210° C. until the acid number was 11. Throughout the reaction cold benzene was added as needed to control the temperature. The benzene was removed from the reaction mixture by distillation upon completion of the reaction. Also throughout the reaction, nitrogen was bubbled through the mixture at 200 cc./min. and a nitrogen atmosphere was kept in the flask above the reaction mixture. The alkyl resin produced had a Gardner Color of 10. The Gardner viscosity was Z–1 and the acid number 11, all at 100% solids.

Now having described our invention, what we claim is:

1. A process for the preparation of alkyd resins which comprises first reacting phthalic anhydride with a compound selected from the group consisting of monoglycerides of higher fatty acids, pentaerythritol esters of higher fatty acids and their mixtures; and when the acid number of the reaction product is in the range of about 20 to about 60 reacting tris(hydroxymethyl)aminomethane with the said first reaction product.

2. The process of claim 1 wherein the phthalic anhydride is in the acid form.

3. The process of claim 1 wherein the first reaction is conducted at a temperature ranging from about 220° C. to about 250° C., and the molar ratio of phthalic anhydride to monoglyceride is from about 1.6:1.0 to about 7.4:1.0; and the reaction of tris(hydroxymethyl)aminomethane with the partial reaction product is conducted at a temperature ranging from about 180° C. to about 210° C., the molar ratio of tris(hydroxymethyl)aminomethane to phthalic anhydride ranging from about 0.007:1.0 to about 0.13:1.0.

4. The process of claim 3 where the fatty acid is linseed oil fatty acid.

5. The process of claim 3 where the fatty acid is tall oil fatty acid.

6. The process of claim 3 where the fatty acid is castor oil fatty acid.

7. The process of claim 3 where the fatty acid is soybean oil fatty acid.

8. The process of claim 3 wherein an inert gas is bubbled through the reaction mixture during the reactions.

9. The process of claim 3 where the fatty acids are selected from the group consisting of linseed oil fatty acids, tall oil fatty acids, castor oil fatty acids, and soybean oil fatty acids.

10. The process of claim 9 wherein the monoglyceride is prepared in situ by combining fatty acids with glycerin.

11. The process of claim 9 wherein the monoglyceride is prepared in situ by the alcoholysis of triglycerides with glycerin.

12. The process of claim 9 wherein the pentaerythritol ester of fatty acids is prepared in situ by combining fatty acids with pentaerythritol.

13. The process of claim 9 wherein the pentaerythritol ester of fatty acids is prepared in situ by the alcoholysis of glycerol esters with pentaerythritol.

14. As a new composition of matter the alkyd resin product obtained by the process of claim 9.

15. A process for the preparation of alkyd resins which comprises first reacting phthalic anhydride with a compound selected from the group consisting of monoglycerides of higher fatty acids, pentaerythritol esters of higher fatty acids and their mixtures, and when the acid number of the reaction product is in the range of about 20 to about 60 reacting tris(hydroxymethyl)aminomethane with the said first reaction product, while bubbling an inert gas through the reaction mixture throughout the reactions.

References Cited by the Examiner

UNITED STATES PATENTS

| | | | |
|---|---|---|---|
| 1,998,744 | 4/1935 | Ubben | 260—75 |
| 2,373,250 | 4/1945 | Lycan et al. | 260—404 |
| 2,559,440 | 7/1951 | Jordan et al. | 260—404.5 |
| 2,595,625 | 5/1952 | Agnew | 260—75 |
| 2,820,711 | 1/1958 | Kiebler et al. | 106—34 |
| 2,892,812 | 6/1959 | Helbing | 260—75 |
| 2,973,331 | 2/1961 | Kraft | 260—22 |
| 3,053,783 | 9/1962 | Broadhead et al. | 260—75 |

OTHER REFERENCES

Chatfield: "Varnish Constituents," Leonard Hill Limited, London, 3rd edition, 1953, 868 pages (pages 273 and 276 relied upon) TP938 C53.

LEON J. BERCOVITZ, *Primary Examiner.*

M. STERMAN, *Examiner.*